US010055845B2

(12) United States Patent
Herling et al.

(10) Patent No.: US 10,055,845 B2
(45) Date of Patent: Aug. 21, 2018

(54) METHOD AND IMAGE PROCESSING SYSTEM FOR DETERMINING PARAMETERS OF A CAMERA

(71) Applicant: Facebook, Inc., Menlo Park, CA (US)

(72) Inventors: Jan Herling, Ilmenau (DE); Wolfgang Broll, Erfurt (DE)

(73) Assignee: Facebook, Inc., Menlo Park, CA (US)

( * ) Notice: Subject to any disclaimer, the term of this patent is extended or adjusted under 35 U.S.C. 154(b) by 107 days.

(21) Appl. No.: 14/432,075

(22) PCT Filed: Sep. 28, 2012

(86) PCT No.: PCT/EP2012/069161
§ 371 (c)(1),
(2) Date: Mar. 27, 2015

(87) PCT Pub. No.: WO2014/048481
PCT Pub. Date: Apr. 3, 2014

(65) Prior Publication Data
US 2015/0243029 A1  Aug. 27, 2015

(51) Int. Cl.
*H04N 5/225* (2006.01)
*G06T 7/00* (2017.01)
(Continued)

(52) U.S. Cl.
CPC ........ *G06T 7/0018* (2013.01); *G06K 9/00664* (2013.01); *G06K 9/6232* (2013.01);
(Continued)

(58) Field of Classification Search
CPC combination set(s) only.
See application file for complete search history.

(56) References Cited

U.S. PATENT DOCUMENTS

| 7,492,476 B1* | 2/2009 | Dodge | ...................... G06T 7/75 345/418 |
| 2002/0069013 A1* | 6/2002 | Navab | .................... G01C 21/20 701/522 |
| 2010/0045701 A1* | 2/2010 | Scott | ....................... G01S 5/163 345/633 |

(Continued)

OTHER PUBLICATIONS

"Markerless Tracking for Augmented Reality", Herling et al. (Herling), Jul. 13, 2011, Ch. 11, Handbook of Augmented Reality, pp. 255-272.*

(Continued)

*Primary Examiner* — Janese Duley
(74) *Attorney, Agent, or Firm* — Baker Botts L.L.P.

(57) ABSTRACT

A method and image processing system determine parameters of a camera. According to the method, an image of a surrounding area is captured by the camera, and camera parameters are initially determined. Furthermore, a three-dimensional geometric description of visual features of the surrounding area is provided. A feature detector is used on the captured image in order to extract visual features. The initially determined camera parameters are applied to the three-dimensional geometric description of the visual features of the surrounding area in order to display said visual features on a feature image. A quantity of the visual features extracted from the image is compared with a quantity of the visual features in the feature image to determine a degree of concordance between the two quantities. The camera parameters are changed repeatedly to determine additional feature images for which the degree of concordance is determined until said degree exceeds a threshold.

20 Claims, 2 Drawing Sheets

(51) Int. Cl.
  *G06K 9/00* (2006.01)
  *G06K 9/62* (2006.01)
  *G06T 19/00* (2011.01)
  *G06T 7/80* (2017.01)

(52) U.S. Cl.
  CPC .............. *G06T 7/80* (2017.01); *G06T 19/006* (2013.01); *H04N 5/2257* (2013.01)

(56) References Cited

U.S. PATENT DOCUMENTS

2012/0133780 A1* 5/2012 Zhang .................. G06T 7/0018
  348/187
2013/0121558 A1* 5/2013 Jin ........................... G06T 7/73
  382/154

OTHER PUBLICATIONS

"Learning Generative Models of Invariant Features", Sim et al. (Sim), Proceedings of 2004 IEEE/RSJ International Conference on Intelligent Robots and Systems, Sep. 28-Oct. 2, 2004 (Year: 2004).*

J. Herling and W. Broil: "An adaptive training-free feature tracker for mobile phones" in Proc. of VRST'10, pp. 35-42, New York, 2010, ACM (8 pages total).

I. Gordon and D. G. Lowe: "What and where: 3d object recognition with accurate pose" in Toward Category-Level Object Recognition, pp. 67-82, 2006 (16 pages total).

D. Wagner, G. Reitmayr, A. Mulloni, T. Drummond and D. Schmalstieg: "Pose tracking from natural features on mobile phones" in Proc. of ISMAR'08, pp. 125-134, Washington, DC, USA, 2008 (10 pages total).

Jan Herling and Wolfgang Broll Ed—Furht B: "Markerless Tracking for Augmented Reality", Sep. 28, 2011 (Sep. 28, 2011), Handbook of Augmented Reality, Spri Nger, pp. 255-272 (18 pages total).

Maidi et al: "Markerless tracking for mobile augmented reality". Signal and Image Processing Applications (ICSIPA). 2011 IEEE Internationalconference on. IEEE. Nov. 16, 2011 (6 pages total).

International Search Report dated Jul. 22, 2013, issued in connection with International Application No. PCT/EP2012/069161 (2 pages total).

Office Action for CA Application No. 2,883,119, dated Aug. 11, 2017.

* cited by examiner

METHOD AND IMAGE PROCESSING SYSTEM FOR DETERMINING PARAMETERS OF A CAMERA

FIELD OF THE INVENTION

The present invention concerns a method for determining of parameters of a camera, especially the so-called self-calibration of the camera. The camera is used to take a picture of a surrounding area, for example, for the purpose of creating an augmented reality, namely, for the perspectively adapted insertion of synthetic visual objects into the picture of the surrounding area. Moreover, the invention concerns an image processing system for the determination of parameters of a camera.

BACKGROUND OF THE INVENTION

In the scientific article of J. Herling and W. Broll: "An adaptive training-free feature tracker for mobile phones" in Proc. of VRST'10, pages 35-42, New York, 2010, ACM, a method is indicated for the determination of parameters of a camera of a mobile telephone. The method can be applied to live recorded moving picture sequences and is based on the determination of SURF features.

The scientific article of I. Gordon and D. G. Lowe: "What and where: 3d object recognition with accurate pose" in Toward Category-Level Object Recognition, pages 67-82, 2006, shows a method of object recognition for the creation of an augmented reality.

In the scientific article of D. Wagner, G. Reitmayr, A. Mulloni, T. Drummond and D. Schmalstieg: "Pose tracking from natural features on mobile phones" in Proc. of ISMAR'08, pages 125-134, Washington, D.C., USA, 2008, a method is shown for tracking the movements of a camera of a mobile telephone, which can be used to create an augmented reality, for example.

SUMMARY OF THE INVENTION

The problem being solved by the present invention starts from the prior art and consists in reducing the expense for the determination of camera parameters during a self-calibration. This should make it possible, for example, to track the movements of a camera of a smartphone while the user is using the smartphone to record a surrounding area, while the recorded image of the smartphone can be augmented by synthetic visual objects that are inserted perspective-correct.

This problem is solved by a method according to the enclosed claim 1 and by an image processing system according to the inserted subordinate claim 14.

The method according to the invention serves to determine parameters of a camera. The parameters for example describe the location and orientation as well as the optical properties of the camera. The method according to the invention serves in particular for the so-called self-calibration of the camera, by which the camera parameters are determined on the basis of pictures taken by the camera. The camera is used to record an image of a surrounding area, for example, with the purpose of creating an augmented reality, namely, for the perspectively-adapted insertion of synthetic visual objects into the image of the surrounding area. The surrounding area can be a natural surrounding area, which is recorded with the camera actually present. Basically, this process can also be simulated by recording a synthetic surrounding area with a virtual camera.

In one step of the method according to the invention, a three-dimensional geometrical description of visual features of the surrounding area is prepared. This can be done in various ways. For example, a natural surrounding area can be recorded multiscopically in order to extract certain features, such as corners or edges, and determine their three-dimensional arrangement. In the case of a synthetic surrounding area, the three-dimensional geometrical description can be obtained directly from the model. The three-dimensional arrangement of the visual features can also be done by a surveying of the surrounding area with metering devices or sensors. In any case, as a result of this step of the method, several visual features such as corners, edges or blobs and their spatial arrangement in the surrounding area are recognized. The three-dimensional geometrical description of the visual features indicates each time the location of the respective visual feature in the space of the surrounding area. Moreover, the visual features are each time described at least in that they exist.

In a further step of the method, there is a recording of an image of the surrounding area with the camera. The image can be a single image or a sequence of images, such as a moving picture. The camera can be integrated in a smartphone or a tablet computer, for example. The recording of the image can occur in a temporal connection with the other steps of the method, or also temporally separated from them. Thus, for example, this step can also be given in that a movie exists, which includes several images of a natural surrounding area recorded with a camera.

Furthermore, there is an initial establishing of camera parameters. The camera parameters include at least one extrinsic parameter of the camera. The extrinsic parameters of the camera describe external parameters, i.e., in particular, the location and orientation of the camera. The at least one extrinsic parameter can be formed, for example, by a coordinate of the position of the camera. During the initial establishing of the at least one camera parameter one can use, for example, typical or anticipated arrangements of the camera. Sensors on the camera can also be used for this.

In a further step of the method according to the invention, a feature detector is applied to the recorded image in order to extract visual features from the recorded image. The visual features are features which can be determined in the course of the image processing, for example, edges or corners. As a result of this step, several visual features of the image and their position in the image are recognized. In a further step, the camera is simulated on the basis of the initially established camera parameters. In this process, a model of the camera with the initially established camera parameters is applied to the three-dimensional geometrical description of the visual features of the surrounding area, so that the visual features of the surrounding area are displayed on a feature image. Thus, there is a transformation of the three-dimensional geometrical description of the visual features onto the two-dimensional feature image based on the camera with the initially established camera parameters.

The feature image and the visual features extracted from the image ultimately represent the same information about the surrounding area. However, the arrangement of the visual features in the feature image will differ from the arrangement of the visual features in the recorded image, since the initially established camera parameters generally do not as of yet describe accurately the camera at the time of the recording of the image, but rather a discrepancy will exist. Nor will all the visual features present in the feature image have a corresponding visual feature in the recorded image, and vice versa. According to the invention, a comparison is made between a set of visual features extracted from the image and a set of visual features in the feature image, in order to determine a measure of concordance between these two sets. Consequently, there is no comparing of directly corresponding features to each other, but instead sets of features are compared with each other in their entirety, comprising at least several corresponding features. The measure of concordance can be found, for example, by a determination of the sum of squared distances.

In order to approximate the initially established camera parameters to the actual parameters given for the camera, the camera parameters in a next step of the method according to the invention are changed, while it is not known at first whether the change will result in coming closer to the actual parameters given for the camera. In the next step, the altered camera parameters are now also applied to the three-dimensional geometrical description of the visual features of the surrounding area by simulating the camera with the changed camera parameters. In this way, the visual features of the surrounding area are displayed on another feature image. There is now performed a comparing of a set of visual features extracted from the image to a set of the visual features in the additional feature image in order to determine the measure of concordance between these two sets. According to the invention, the steps of the comparison of the camera parameters, the application of the changed camera parameters and the comparison of the sets is repeated until the so determined measure of concordance has passed a limit value. Thus, the camera parameters are repeatedly changed without knowing the effects and this with the goal of achieving an approximation to the actually given camera parameters. The individual cycles thus constitute trials whose effect is only found by determining the measure of concordance. In the most elementary case, one ends the repeated changing and applying of the camera parameters and the repeated comparing of the sets and the determining of the measure of concordance once this measure has passed the limit value, whereupon the last changed camera parameters constitute the ascertained camera parameters for the image.

A special benefit of the method according to the invention is that the camera parameters can be ascertained in an especially effective way, so that the method can be carried out in real time, for example, on a smartphone. The special efficiency of the method is due to the fact that only sets of visual features are compared, so that individual correspondences can be left out of consideration and other visual properties can also be left our of account. In the end, it only requires a comparing of two point clouds each representing the arrangement of the visual features, which can be done especially effectively.

Especially preferably, the method is used during the recording of natural surrounding areas in order to create an augmented reality, for example. In this case, the surrounding area is formed by a natural surrounding area and at the same time the camera is formed by a real existing camera. Alternatively, the method according to the invention can also be applied to synthesized surrounding areas. In this case, the surrounding area is formed by a synthesized surrounding area, which is recorded by a virtual camera. In this case, the surrounding area and the recording by the camera are simulated.

Although the method according to the invention enables a self-calibration of the camera, the determination of the camera parameters can be supported by sensors or other metering devices. For example, GPS sensors or optical sensor scan be used for this.

In especially preferred embodiments of the method according to the invention, for the comparing of the set of visual features extracted from the image with the set of visual features in the feature image one compares the absolute and relative position of the individual visual features in the image. Thus, there is a comparing of point clouds in two dimensions, for which efficient algorithm scan be used. In this, one preferably leaves out of account the visual appearance of the features and their surrounding area. Consequently, when comparing of the set of visual features extracted from the image with the set of visual features in the feature image, one preferably leaves out of account visual properties other than the visual features as such. The visual features as such each time constitute the information as to the existence of the visual feature, such as an edge or a corner, its position in the image, and optionally a measure of the reliability of detection of the feature. On the other hand, other visual properties are preferably left out of account, such as the color of the visual feature or the color in the surrounding area of the visual feature. A special benefit of the method according to the invention is precisely the fact that one can dispense with other visual properties, since the approach of comparing of sets of the visual features and the repeated changing of the camera parameters already leads to satisfactory results.

The changing of the camera parameters is preferably done at random and within defined limits. It is also possible to change only certain of the camera parameters each time, such as only two of the three coordinates of the location of the camera. It is also possible to change all of the camera parameters each time, or to change the individual camera parameters in alternation. Alternatively to a random changing, one can also change the camera parameters stepwise in predefined directions. In any case, the changing of the camera parameters is done with no a-priori knowledge of the effects.

The limits within which the camera parameters are changed at random are preferably decreased when the repeatedly determined measure of concordance is larger than the previously determined measure of concordance. Thus, one changes the camera parameters more slightly upon approaching the parameters actually given for the camera.

In simple embodiments of the method according to the invention, the last changed camera parameters are output directly and used for subsequent applications, such as the inserting of synthetic visual objects. Preferably, however, the ascertained camera parameters are still adapted in order to further enhance the accuracy of the camera parameters. For this, preferably one first performs a step in which certain visual features extracted in the image are selected, having at least one lower limit value of a measure of reliability of the detection of the visual feature. Those, only those of the extracted visual features are selected whose detection was done with adequate certainty. Next, there is a selection of those visual features in the last determined feature image which correspond to the selected visual features extracted in the image. Thus, as a result, one has detected feature correspondences representing actually existing concordances with a high probability. In the next step, a comparison is done between the geometrical arrangement of the selected visual features extracted in the image and the geometrical arrangement of the corresponding visual features in the last determined feature image in order to adapt the last determined camera parameters and thus heighten their accuracy. Thus, in this adaptation step, there is no longer a comparing of only sets of features to each other, but instead a comparing of corresponding feature pairs. As a result, the application of the adapted camera parameters to the three-dimensional geometrical description of the visual features of the surrounding area results in an adapted feature image displaying the visual features of the surrounding area. In this adapted feature image, the arrangement of the corresponding visual features is equal to the geometrical arrangement of the selected visual features extracted in the image, so that the adapted camera parameter are mostly equal to the parameters actually given in the camera. The adapting of the camera parameters is preferably done by a nonlinear optimization, such as a nonlinear least squares optimization.

The set of the visual features extracted from the image preferably constitutes a proper subset of the visual features extracted from the image. The proper subset of the visual features extracted from the image is preferably determined by selecting those of the extracted visual features which do not pass a lower limit value for a measure of reliability. In this way, unreliably detected features are not taken into account. Furthermore, the proper subset of the visual features extracted from the image is preferably determined by sorting out those of the extracted visual features which cannot coincide with visual features in the feature image on account of geometrical conditions. In this way, extracted visual features are sorted out which cannot have any correspondence in the feature image on account of geometrical boundary conditions.

The set of visual features in the feature image is preferably formed by a proper subset of the visual features in the feature image. The proper subset of visual features in the feature image is preferably determined by selecting those of the visual features in the feature image which do not pass a lower limit value for a measure of reliability. In this way, those features in the feature image are sorted out which were not reliably determined. Furthermore, the proper subset of the visual features in the feature image is preferably determined by sorting out those of the visual features in the feature image which cannot coincide with the visual features extracted from the image on account of geometrical conditions. Thus, those of the visual features in the feature image are sorted out which cannot be represented in the recorded image.

The prepared description of the visual features of the surrounding area preferably describes those visual features which can be detected with the selected feature detector. Consequently, the features in the feature image and the extracted features of the recorded image are of the same kind, such as basically an edge. Thanks to the identical nature of the features in the feature image and the features extracted from the image, they can be compared to each other.

The preparing of the three-dimensional geometrical description of visual features of the surrounding area can be done, for example, by recording several images of the surrounding area from different perspectives and then applying the feature detector to these images. Since the images of the surrounding area were recorded from different perspectives, the features can be coordinated in space. The images of the surrounding area that are recorded from different perspectives can be recorded at the same time or successively in time.

The method according to the invention is characterized in that the initially established camera parameters are repeatedly changed until they are equal or similar in satisfactory measure to the actually given camera parameters. In preferred embodiments of the method according to the invention, this cycle is run through several times, so that the camera parameters are present on multiple occasions and the camera parameters coming closest to the actual camera parameters can be selected as the ascertained camera parameters For this, the steps of the repeated changing of the camera parameters are carried out several times, starting with the initially established camera parameters, the repeated application of the changed camera parameters to the three-dimensional geometrical description of the visual features of the surrounding area and the repeated comparison of a set of visual features extracted from the image with a set of visual features in the additional feature image until a limit value is passed by the ascertained measure of concordance. Those of the last changed camera parameters are selected to be the ascertained camera parameters for the image when the ascertained measure of concordance passes the limit value by the most. The repeatedly performed steps, i.e., the individual cycles, are preferably carried out parallel in time, for example, on a multiprocessor system.

The feature detector can be any one of the known feature detectors from image processing. The feature detector is preferably designed to detect corners, edges, texture patterns and/or blobs. In particular, these can be FAST features, Harris corners, SURF features or SIFT features.

The method according to the invention is preferably applied to a moving picture. The mentioned recorded image in this case is a first image of the moving picture sequence. Furthermore, at least one second image of the surrounding area is recorded with the camera. The feature detector is applied to the second image in order to extract visual features from the second image. The camera parameters ascertained for the first image are now applied to the three-dimensional geometrical description of the visual features of the surrounding area in order to display the visual features of the surrounding area on a feature image. Consequently, the camera parameters ascertained for the first image form the camera parameters initially determined for the second image. In most cases, the camera parameters ascertained for the first image will be far more similar to the camera parameters during the recording of the second image than the initially determined camera parameters to the camera parameters given during the recording of the first image. Next comes a comparison of a set of the visual features extracted from the second image with a set of the visual features in the last ascertained feature image in order to determine a measure of concordance between these two sets. In the same way as for the first image, there now occurs a changing of the camera parameters and an applying of the changed camera parameters to the three-dimensional geometrical description of the visual features of the surrounding area in order to display the visual features of the surrounding area on an additional feature image. A set of the visual features extracted from the second image is compared with a set of the features in the additional feature image in order to determine the measure of concordance between these two sets. In the same way as for the first image, the steps of changing the camera parameters, the applying of the changed camera parameters and the comparing of the sets are repeated until the ascertained measure of concordance has passed a limit value. The last changed camera parameters will then constitute the ascertained camera parameters for the second image.

In preferred embodiments, the moving picture comprises, besides the first image and the second image, a plurality of other successive images, for which each time the steps indicated for the second image are carried out, provided that the first image is formed by the previous image. Thus, the camera parameters used for the initialization are always the ones that were ascertained for the previous image.

The steps of the method preferably carried out for the recorded image are also preferably carried out for the second image and the further images.

The camera parameters can change over time in a moving picture sequence, especially if the camera is moved or when the focal length is changed, for example. This ultimately means that the surrounding area is recorded from different perspectives, so that the preparation of the three-dimensional geometrical description of visual features of the surrounding area can be done on the basis of the recorded images. This enables a continuing preparation of the three-dimensional geometrical description of the visual features of the surrounding area, for example, in order to describe additional visual features of the surrounding area or to heighten the accuracy of the description. Basically the steps of the preparation of the three-dimensional geometrical description of the visual features of the surrounding area and the steps for recording the first image, the second image, and the further images can be nested together.

From the second image on, the information ascertained for the preceding image can be utilized; at least for the initializing of the camera parameters. Furthermore, information about the extracted visual features from the preceding image can also be utilized. Preferably, such extracted visual features as have been ascertained with high reliability are also used for the next image each time. Therefore, the set of visual features extracted from the second image and used for the comparison preferably coincides with the set of visual features extracted from the first image when the visual features extracted in the first image have at least a first lower limit value of a measure of reliability. However, it will happen that some of the extracted visual features do not have the requisite reliability. Then the set of visual features extracted from the second image and used for the comparison preferably only comprises part of the set of visual features extracted from the first image, if the visual features extracted in the first image have at least a second lower limit value of the measure of reliability. In this case, the second lower limit value is smaller than the first lower limit value.

The method according to the invention as applied to a moving picture sequence is preferably performed in real time, so that it is suitable for the creation of an augmented reality.

The camera parameters preferably comprise several of the extrinsic parameters for the description of the orientation of the camera. For example, the extrinsic parameters can be formed by two angles, describing swivel movements and tilting movements of the camera. Preferably the camera parameters comprise other of the extrinsic parameters for the description of the spatial position of the camera. For example, the camera parameters can comprise three coordinates as extrinsic parameters for the complete description of the spatial position of the camera.

In preferred embodiments of the method according to the invention, the camera parameters also comprise intrinsic camera parameters besides the extrinsic ones. The intrinsic camera parameters i.e., the internal camera parameters describe in particular the optical imaging in the camera. Preferably, the intrinsic camera parameters comprise at least the focal length of the camera.

The choice of the camera parameters is preferably adapted to the type of camera and the particular use. For example, insofar as the camera of a smartphone or a tablet computer is being used, the camera parameters preferably comprise all six extrinsic camera parameters, while no intrinsic parameters need be used.

The image processing system according to the invention is designed for implementing the method according to the invention. Preferred embodiments of the image processing system according to the invention are designed to implement preferred embodiments of the method according to the invention.

The image processing system is preferably formed by a computer, by a tablet computer or by a smartphone.

BRIEF DESCRIPTION OF THE DRAWINGS

Further details of the invention will emerge from the following description of several schematic diagrams in the drawing. There are shown.

DETAILED DESCRIPTION

Figure 1:
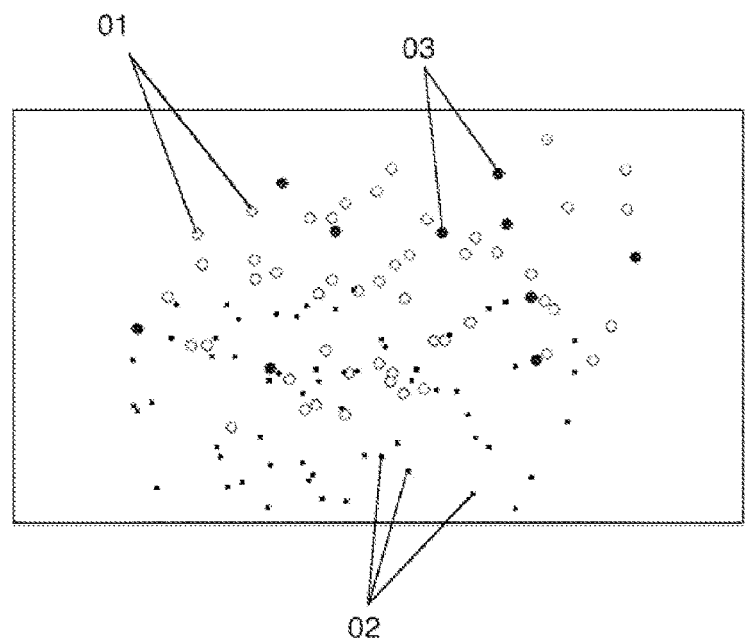
FIG. 1 shows the visual features extracted from a recorded image and a feature image in a superimposed representation.

FIG. 1 shows a two-dimensional representation of visual features 01 which have been extracted from an image that was previously recorded with a camera. The extracted visual features 01 are symbolized by circles. The extracted visual features 01 can be corners or edges that were extracted in the recorded image, for example.

The two-dimensional representation of the extracted visual features 01 is superimposed on a feature image for purposes of illustration, which comprises displayed visual features 02. The feature image is the result of the application of initially established camera parameters to a three-dimensional geometrical description of the visual features of the surrounding area that was recorded with the camera. The visual features 01 extracted from the recorded image and the visual features 02 of the feature image are of the same kind, so that it is always a question of edges, for example.

If the initially established camera parameters were identical to the camera parameters actually present during the recording of the image, the extracted visual features 01 and the visual features 02 of the feature image would be displayed congruently on each other.

The determination of visual features in a recorded image can only be done with a limited reliability. Therefore, there are always wrongly determined features 03, which are symbolized by dark circles.

Figure 2:
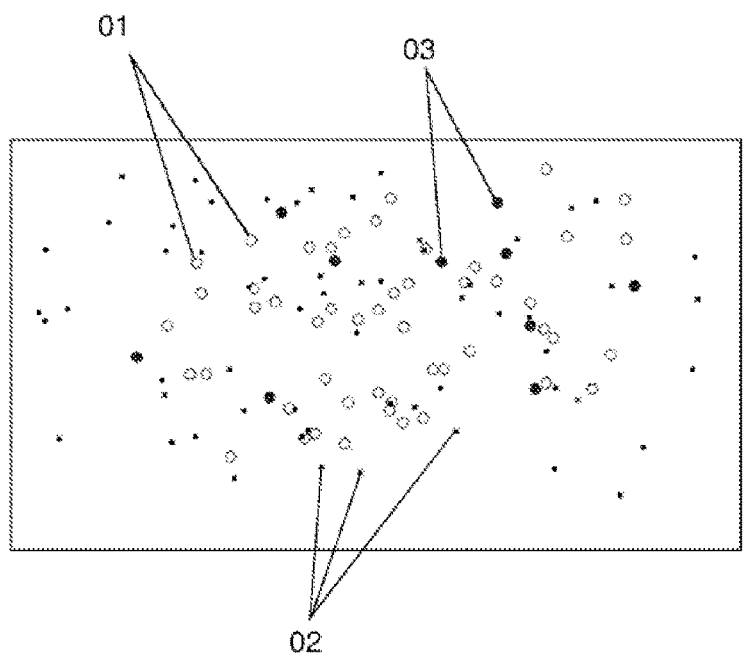
FIG. 2 shows the representation shown in FIG. 1, after camera parameters have been changed.

FIG. 2 shows the representation shown in FIG. 1, after the initially established camera parameters have been changed and an additional feature image has been displayed. Several of the camera parameters, such as the orientation or the position, have been changed at random for this. The change means that the orientation according to the changed camera parameters has been approximated to the actual orientation of the camera when recording the image, whereas the position parameters differ distinctly from the position of the camera during the recording of the first image.

Figure 3:
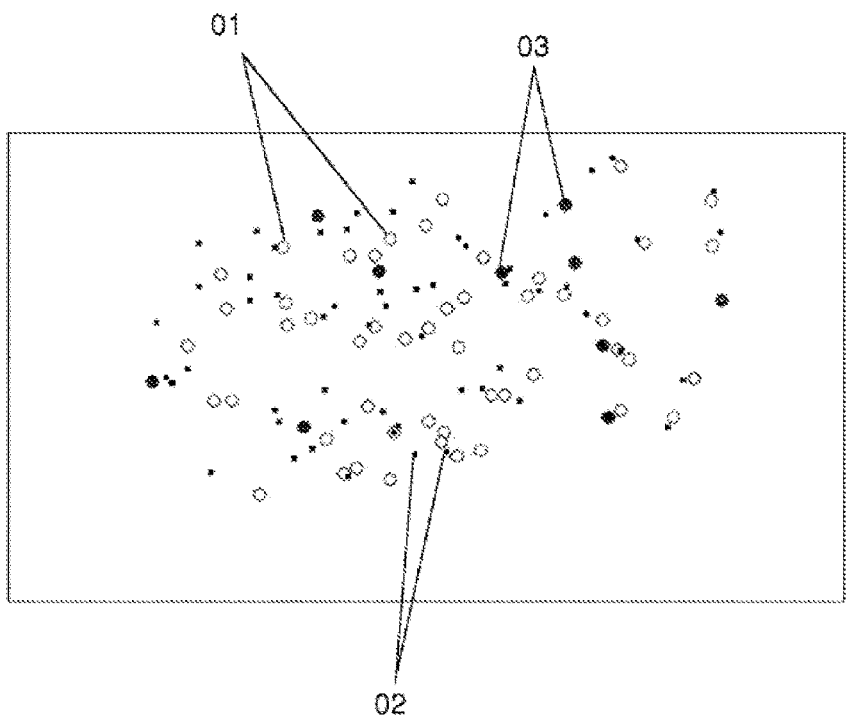
FIG. 3 shows the representation shown in FIG. 2, after the camera parameters have been changed once more.

FIG. 3 shows the representation shown in FIG. 2, after the camera parameters have been again changed and an additional feature image has been determined. In particular, the position parameters have been changed, so that these come closer to the position of the camera used during the recording of the image. As can be seen in FIG. 3, several of the features 02 of the feature image are already in proximity to several of the visual features 01 extracted from the image.

Figure 4:
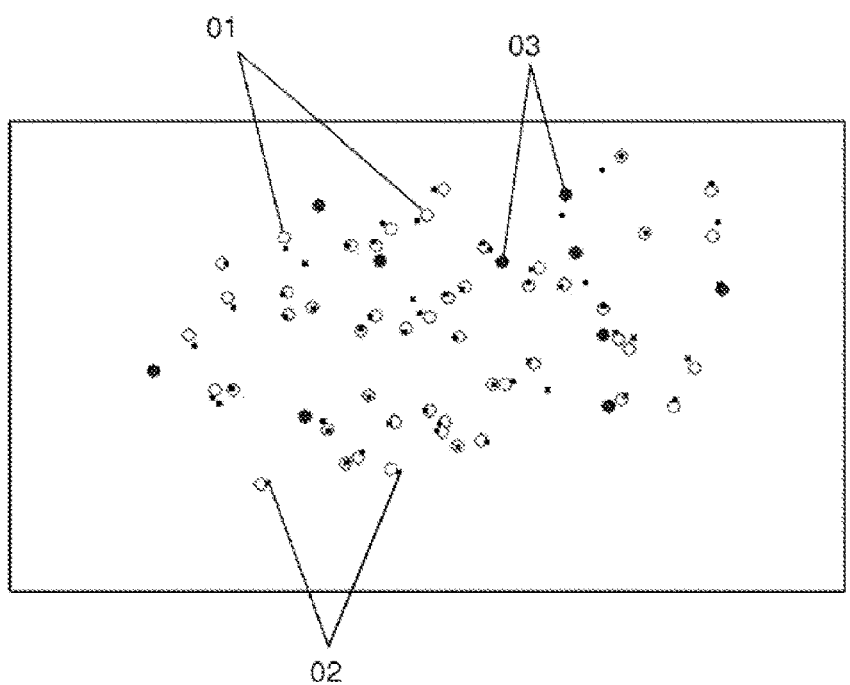
FIG. 4 shows the representation shown in FIG. 3, after the camera parameters have been changed yet again.

FIG. 4 shows the representation shown FIG. 3 after the camera parameters have been changed yet again, so that the features 02 of the additional feature image have been brought for the most part into concordance with the visual features 01 extracted from the image. Thus, the again changed camera parameters constitute an adequate approximation to the camera parameters actually present during the recording of the image, so that they constitute the outcome of the method according to the invention.

LIST OF REFERENCE NUMBERS

01—visual features extracted from the recorded image
02—visual features displayed in the feature image
03—wrongly extracted visual features

The invention claimed is:
1. A method comprising:
  generating a three-dimensional model of a surrounding area, wherein the three-dimensional model of the surrounding area describes a geometrical arrangement of visual features of the surrounding area;
  establishing initial parameters of a camera, the initial parameters of the camera indicating an approximate location or orientation of the camera;
  recording an image of the surrounding area with the camera;
  extracting a set of visual features from the recorded image by applying a feature detector to the recorded image;
  generating a feature image of the surrounding area by applying the initially established parameters of the camera to the three-dimensional model of the surrounding area, the feature image comprising the visual features of the surrounding area, wherein the geometrical arrangement of the visual features in the feature image differs from the geometrical arrangement of the visual features in the recorded image;
  comparing the set of visual features extracted from the recorded image to a set of visual features in the feature image in order to determine a first measure of concordance between the visual features in the recorded image and the visual features in the feature image;
  adjusting the parameters of the camera based on the comparison;
  generating a subsequent feature image of the surrounding area by applying the adjusted parameters of the camera to the three-dimensional model of the surrounding area;
  comparing the set of visual features extracted from the recorded image to a set of visual features in the subsequent feature image in order to determine a second measure of concordance between the visual features in the recorded image and the visual features in the subsequent feature image; and
  determining the adjusted parameters of the camera as the camera parameters for the recorded image in response to determining the second measure of concordance between the visual features in the recorded image and the visual features in the subsequent feature image is greater than a threshold value.

2. The method of claim 1, wherein the surrounding area is formed by a natural surrounding area and the camera is formed by a real camera.

3. The method of claim 1, wherein comparing the set of visual features extracted from the recorded image to the set of visual features in the feature image comprises comparing the absolute and relative positions of the individual visual features in the two images.

4. The method of claim 3, wherein when comparing the set of visual features extracted from the recorded image to the set of visual features in the feature image, visual properties other than the visual features are left out of account.

5. The method of claim 1, wherein the set of the visual features extracted from the recorded image is a proper subset of the visual features extracted from the recorded image, and the proper subset of the visual features extracted from the recorded image is determined by selecting those of the extracted visual features which do not pass a lower limit value for a measure of reliability.

6. The method of claim 1, wherein the geometrical model of the surrounding area comprises those visual features which can be detected with the feature detector.

7. The method of claim 6, wherein generating the three-dimensional model of the surrounding area is done by applying the feature detector to several images of the surrounding area recorded from different perspectives.

8. The method of claim 1, wherein the method is applied to a moving picture, and wherein the recorded image forms a first image and wherein the method further comprises:
  recording a second image of the surrounding area with the camera;
  extracting a set of visual features from the second image by applying the feature detector to the second image;
  applying camera parameters ascertained for the first image to the three-dimensional model of the surrounding area in order to display the visual features of the surrounding area on a feature image;
  comparing a set of visual features extracted from the second image to a set of visual features in the feature image in order to determine the first measure of concordance between the two sets;
  adjusting the parameters of the camera based on the comparison;
  applying the adjusted parameters of the camera to the three-dimensional model of the surrounding area in order to display the visual features of the surrounding area on a subsequent feature image; and
  comparing the set of visual features extracted from the second image to a set of visual features in the subsequent feature image in order to determine the second measure of concordance between the two sets, wherein steps of adjusting the camera parameters, applying the adjusted camera parameters and comparing the sets are repeated until the ascertained measure of concordance has passed the threshold value, wherein last adjusted camera parameters constitute the ascertained camera parameters for the second image.

9. The method of claim 8, wherein the moving picture comprises, besides the first image and the second image, a plurality of other successive images, for which each time the steps indicated for the second image are carried out, provided that the first image is formed by the previous image each time.

10. The method of claim 1, wherein the second measure of concordance between the visual features in the recorded image and the visual features in the subsequent feature image is greater than the threshold value when the geometrical arrangement of the visual features between the two images is substantially the same.

11. The method of claim 1, further comprising:
  determining that the second measure of concordance between the set of visual features extracted from the recorded image and the set of visual features in the subsequent feature image is less than the threshold value; and repeating steps of adjusting the parameters of the camera, generating a subsequent feature image of the surrounding area, and comparing the set of visual features extracted from the recorded image to a set of visual features in the subsequent feature image until the second measure of concordance between the set of visual features extracted from the recorded image and the set of visual features in the subsequent feature image is greater than the threshold value.

12. The method of claim 11, wherein last adjusted parameters of the camera are selected to be the ascertained camera parameters for the recorded image.

13. The method of claim 11, wherein adjusting the parameters of the camera is done at random and within limits.

14. The method of claim 13, wherein the limits for adjusting the parameters of the camera are decreased when the second measure of concordance is larger than the first measure of concordance.

15. A system comprising: one or more processors; and a memory coupled to the processors comprising instructions executable by the processors, the processors operable when executing the instructions to:

generate a three-dimensional model of a surrounding area, wherein the three-dimensional model of the surrounding area describes a geometrical arrangement of visual features of the surrounding area;

establish initial parameters of a camera, the initial parameters of the camera indicating an approximate location or orientation of the camera;

record an image of the surrounding area with the camera;

extract a set of visual features from the recorded image by applying a feature detector to the recorded image;

generate a feature image of the surrounding area by applying the initially established parameters of the camera to the three-dimensional model of the surrounding area, the feature image comprising the visual features of the surrounding area, wherein the geometrical arrangement of the visual features in the feature image differs from the geometrical arrangement of the visual features in the recorded image;

compare the set of visual features extracted from the recorded image to a set of visual features in the feature image in order to determine a first measure of concordance between the visual features in the recorded image and the visual features in the feature image;

adjust the parameters of the camera based on the comparison;

generate a subsequent feature image of the surrounding area by applying the adjusted parameters of the camera to the three-dimensional model;

compare the set of visual features extracted from the recorded image to a set of visual features in the subsequent feature image in order to determine a second measure of concordance between the visual features in the recorded image and the visual features in the subsequent feature image; and determine the adjusted parameters of the camera as the camera parameters for the recorded image in response to determining the second measure of concordance between visual features in the recorded image and the visual features in the subsequent feature image is greater than a threshold value.

16. The system of claim 15, wherein the second measure of concordance between the visual features in the recorded image and the visual features in the subsequent feature image is greater than the threshold value when the geometrical arrangement of the visual features between the two images is substantially the same.

17. The system of claim 15, wherein the processors are further operable to:

determine that the second measure of concordance between the set of visual features extracted from the recorded image and the set of visual features in the subsequent feature image is less than the threshold value; and repeat steps of adjusting the parameters of the camera, generating a subsequent feature image of the surrounding area, and comparing the set of visual features extracted from the recorded image to a set of visual features in the subsequent feature image until the second measure of concordance between the set of visual features extracted from the recorded image and the set of visual features in the subsequent feature image is greater than the threshold value.

18. The system of claim 17, wherein last adjusted parameters of the camera are selected to be the ascertained camera parameters for the recorded image.

19. The system of claim 17, wherein adjusting the parameters of the camera is done at random and within limits.

20. The system of claim 19, wherein the limits for adjusting the parameters of the camera are decreased when the second measure of concordance is larger than the first measure of concordance.

* * * * *